United States Patent
Wang et al.

(10) Patent No.: US 7,099,509 B2
(45) Date of Patent: Aug. 29, 2006

(54) METHOD OF EDGE DIRECTION DETECTION BASED ON THE CORRELATIONS BETWEEN PIXELS OF A VECTOR AND AN EDGE DIRECTION DETECTION SYSTEM

(75) Inventors: Xianglin Wang, Santa Ana, CA (US); Yeong-Taeg Kim, Irvine, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 744 days.

(21) Appl. No.: 10/269,464

(22) Filed: Oct. 11, 2002

(65) Prior Publication Data

US 2003/0076447 A1  Apr. 24, 2003

(51) Int. Cl.
*G06K 9/46* (2006.01)
(52) U.S. Cl. ..................................... 382/199
(58) Field of Classification Search ................ 382/199
See application file for complete search history.

(56) References Cited

U.S. PATENT DOCUMENTS

| | | | |
|---|---|---|---|
| 4,937,667 A | 6/1990 | Choquet et al. | |
| 5,093,721 A | 3/1992 | Rabii | |
| 5,592,231 A | 1/1997 | Clatanoff | |
| 5,786,862 A * | 7/1998 | Kim et al. | 348/448 |

* cited by examiner

*Primary Examiner*—Jingge Wu
*Assistant Examiner*—Kathleen Yuan
(74) *Attorney, Agent, or Firm*—Michael Zarrabian, Esq.; Kenneth L. Sherman, Esq.; Myers Dawes Andras & Sherman, LLP

(57) ABSTRACT

A method for edge direction detection at a selected pixel on a center-line between two lines of an image includes defining two vectors using certain pixels on the two lines. A vector norm is defined which gives an indication of the correlation of between pixels of one vector and pixels of the other vector. If a vertical vector norm value indicates a low correlation in the vertical direction, then it can be assumed that the selected pixel is in a non-vertical edge area. Vector norm values associated with small angles from the vertical direction are used to determine candidate directions for the non-vertical edge. If a candidate direction is verified as being a preferred direction, then a direction-fine tuning process is performed in which vector norm values associated with big angles from the vertical direction are calculated in order to find a more accurate direction for the non-vertical edge.

16 Claims, 7 Drawing Sheets

$D_v$ $D_{0,-1}$ $D_{0,1}$ $D_{1,0}$

METHOD OF EDGE DIRECTION DETECTION BASED ON THE CORRELATIONS BETWEEN PIXELS OF A VECTOR AND AN EDGE DIRECTION DETECTION SYSTEM

BACKGROUND OF THE INVENTION

Field of the Invention

The present invention relates to a method for detecting the edge direction between two neighboring lines in an interlaced or non-interlaced scan using vector norm values and to an edge direction detection system. A vector norm value provides an indication of the correlation between particular pixels on the two lines.

The meaning of the term, "edge direction" can be seen by referring to FIG. 1. Along the edge direction, the luminance values of the pixels either remain constant or change gradually. Across the edge direction, the luminance values of the pixels change sharply.

Detecting the edge direction between two neighboring lines in an interlaced or non-interlaced scan is of great value to many image processing applications. For instance, the edge direction can be used as the interpolation direction in an interlaced-to-progressive conversion (IPC) or image scaling. Interpolating pixels along the edge direction can greatly enhance the edge quality in the interpolated image and can reduce common effects from the IPC or image scaling, such as, serrate lines or blurred edges.

U.S. Pat. No. 5,786,862, which is herein fully incorporated by reference, discloses a method based on the correlations of wide-vectors for obtaining a pixel value by interpolating between two lines selected from an image having a plurality of lines of pixels. This patent teaches interpolating pixels along the edge direction in an edge area so as to preserve the smoothness of edge. The edge direction is determined based on a three-step correlation checking procedure:

a) a vertical vector correlation;
b) a narrow vector correlation; and
c) a wide vector correlation.

Vertical, narrow and wide vectors have different lengths. The three steps are sequentially performed, however, a subsequent correlation step is only actually performed when the previous correlation checking step fails to provide a good correlation. A good correlation would be obtained when the correlation error is acceptable when compared with a predetermined value. Edge direction detection based on the correlations of two lines has been found to be effective. Importantly, however, since the situation around the edge area can be very tricky, the three-step correlation checking method described above may not be effective for all of the edge cases that occur in a real image. It may often introduce a false edge direction or fail to detect the direction of an edge that has a big angle from the vertical direction.

SUMMERY OF THE INVENTION

It is accordingly an object of the invention to provide a method for edge direction detection and an edge direction detection system which overcome the above-mentioned disadvantages of the prior art methods and apparatus of this general type.

With the foregoing and other objects in view there is provided, in accordance with the invention, a method for edge direction detection on a center line between two lines of an image having a plurality of lines of pixels. The method includes steps of: selecting a pixel that is on the center line and defining the pixel as a selected pixel; calculating a vertical vector norm value from a plurality of adjoining pixels being on the two lines and being related to the selected pixel, the vertical vector norm value being associated with a vertical direction; using the vertical vector norm value to determine whether the selected pixel is in a non-vertical edge area; if the selected pixel is in the non-vertical edge area, then calculating two candidate edge directions based on a plurality of small-angle vector norm values each associated with a direction having a small-angle from the vertical direction; if any candidate edge direction is associated with a preferred direction, verifying that the candidate edge direction is consistent with an additional candidate edge direction; if all the candidate edge directions that are associated with a preferred direction are consistent with the additional candidate edge direction, taking the additional candidate edge direction as a starting point for a direction fine tuning process.

The direction fine tuning process includes steps of: determining whether at least one big-angle vector norm value is associated with a more accurate direction than the additional candidate edge direction, the big-angle vector norm value being associated with a direction having an orientation similar to the additional candidate edge direction, but having a bigger angle from the vertical direction than the additional candidate edge direction; if the big-angle vector norm value is associated with a more accurate direction than the additional candidate edge direction, then selecting the more accurate direction as an edge direction for a position of the selected pixel; and if the big-angle vector norm value is not associated with a more accurate direction than the additional candidate edge direction, then selecting the additional candidate edge direction as the edge direction for the position of the selected pixel.

In accordance with an added feature of the invention, the step of calculating the candidate edge direction includes calculating at least two candidate edge directions. Additionally, when neither of the candidate edge directions is associated with a preferred direction, then the method includes performing a direction detection process based solely on big-angle vector norm values associated with directions having bigger angles from the vertical direction than the small-angle.

In accordance with an additional feature of the invention, the method includes: calculating a plurality of vector norm values from the plurality of the adjoining pixels being on the two lines and being related to the selected pixel. The plurality of the vector norm values include the vertical vector norm value, the big-angle vector norm value, and the plurality of the small-angle vector norm values.

In accordance with another feature of the invention, the plurality of the vector norm values are based on vectors defined as:

$$U(l) = [I(n_1 - 1, n_2 - L + l), \ldots, I(n_1 - 1, n_2 + l), \ldots,$$
$$I(n_1 - 1, n_2 + L + l)]$$
$$= [U_{-L}(l), \ldots, U_0(l), \ldots, U_L(l), \text{ and}$$
$$V(m) = [I(n_1 + 1, n_2 - L + m), \ldots, I(n_1 + 1, n_2 + m), \ldots,$$
$$I(n_1 + 1, n_2 + L + m)]$$
$$= [V_{-L}(m), \ldots, V_0(m), \ldots, V_L(m)].$$

In the above equations, I is an original image, L is a constant that relates to a length of each of the vectors, and the length of each of the vectors is 2L+1.

In accordance with a further feature of the invention, each of the plurality of the vector norm values is defined as:

$$D(l, m) = \frac{1}{M} \sum_{i=-L}^{L} |U_i(l) - V_i(m)| C_i.$$

In that equation, $C_l$ is a weight value, and $$M = \sum_i C_i.$$

In accordance with a further added feature of the invention, the vertical vector norm value is defined as:

$$D_v = D(0, 0) = \frac{1}{M} \sum_{i=-L}^{L} |U_i(0) - V_i(0)| C_i.$$

In that equation, $C_l$ is a weight value.

In accordance with a further additional feature of the invention, the plurality of the small-angle vector norm values are defined as:

$$D_{l,m} = D(l, m) = \frac{1}{M} \sum_{i=-L}^{L} |U_i(l) - V_i(m)| C_i;$$

and $(l,m) \in \{(1,0),(-1,0),(0,1),(0,-1)\}$.

In accordance with yet an added feature of the invention, the big-angle norm value is defined as:

$$D(l, -l) = \frac{1}{M} \sum_{i=-L}^{L} |U_i(l) - V_i(-l)| C_i \quad l \in ([-W, -1] \cup [1, W])$$

In this equation, l is an integer, W is a constant that relates to a correlation checking range, and 2W+1 is a maximum correlation checking range.

In accordance with yet an additional feature of the invention, the step of using the vertical vector norm value to determine whether the selected pixel is in the non-vertical edge area includes using a checking function that is equal to the vertical vector norm value minus a predetermined reference correlation value.

In accordance with yet another feature of the invention, the step of calculating at least one candidate edge direction includes:

defining an angle correlation checking function as:

$$f_2(x, y, z, T_s) \begin{cases} -1 & \text{if } x = \min(x, y, z) \text{ and } x < \max(x, y, z) * T_s \\ 1 & \text{if } z = \min(x, y, z) \text{ and } z < \max(x, y, z) * T_s \\ 0 & \text{Otherwise;} \end{cases}$$

using the angle correlation checking function to obtain a first candidate direction defined as $Dir_1 = f_2(D_{-1,0}, D_v, D_{1,0}, T_{s1})$; and using the angle correlation checking function to obtain a second candidate direction defined as $Dir_2 = f_2(D_{0,1}, D_v, D_{0,-1}, T_{s1})$. Here, $T_{s1}$ is a threshold value, $D_v$ is the vertical vector norm value, and $D_{-1,0}$, $D_{1,0}$, $D_{0,1}$, and $D_{0,-1}$ are small-angle vector norm values each associated with a respective direction having a small-angle from the vertical direction.

In accordance with yet a further a feature of the invention, when $Dir_1 = Dir_2 = 0$, it is concluded that the first candidate direction and the second candidate direction are not associated with a preferred direction.

In accordance with an added feature of the invention, the step of verifying that the candidate edge direction is consistent with the additional candidate edge direction includes:

defining a direction verification function as:

$$f_3(Dir_1, Dir_2, Dir_3) = \begin{cases} -1 & \text{if } (Dir_1 \neq 0 \text{ and } Dir_1 \neq Dir_3) \text{ or} \\ & \quad (Dir_2 \neq 0 \text{ and } Dir_2 \neq Dir_3) \quad ; \text{ and} \\ 1 & \text{otherwise} \end{cases}$$

defining the additional candidate direction as $Dir_3 = f_2(D_{-1,1}, D_v, D_{1,-1}, T_{s2})$. Here, $T_{s2}$ is a threshold value, $D_v$ is the vertical vector norm value, and $D_{-1,1}$ and $D_{1,-1}$ are vector norm values each associated with a respective direction having an angle from the vertical direction being bigger than the small-angle.

In accordance with an additional feature of the invention, the step of determining whether a big-angle vector norm value is associated with a more accurate direction than the candidate edge direction, includes: determining whether an initial big-angle vector norm value is associated with a more accurate direction than the candidate edge direction, and if so, setting a current value to be equal to the initial big-angle vector norm value; determining whether a succeeding big-angle norm vector value, which is associated with a direction having a bigger angle from the vertical direction than the current value, has a value that is smaller than the current value, and if so, setting the current value to be equal to the succeeding big-angle norm vector value; and repeating the step of determining whether the succeeding big-angle norm vector value has a value that is smaller than the current value until an event occurs that is selected from a group consisting of finding a succeeding big-angle norm vector value that is greater than the current value and reaching a maximum correlation checking range. The step of selecting the more accurate direction as the edge direction for the position of the selected pixel includes selecting the direction associated with the current value as the edge direction for the position of the selected pixel.

In accordance with another feature of the invention, if the candidate edge direction is not associated with a preferred direction, the method includes: checking a first pair of big-angle norm values against a reference value; if only one big-angle norm value of the first pair of the big-angle norm values is smaller than the reference value, selecting the one big-angle norm value as representative of the edge direction for the position of the selected pixel; if both big-angle norm values of the first pair of the big-angle norm values is smaller than the reference value, concluding that a consistent edge direction for the position of the selected pixel cannot be determined; and if both big-angle norm values of the first pair of the big-angle norm values is greater than the reference value, then performing a sequence of steps. The sequence of steps include: continuing to check pairs of big-angle norm values against corresponding reference values until obtaining an event selected from a group consisting of reaching a maximum correlation checking range and finding one of the pairs of the big-angle norm values having only one norm value being smaller than the corresponding one of the reference values, and selecting the one norm value of the one of the pairs of the big-angle norm values as being representative of the edge direction for the position of the selected pixel.

In accordance with a further feature of the invention, the reference value and the corresponding reference values form a set of reference values $T_k$, where k=1, 2, ..., W, and W is a maximum correlation checking range; the first pair of the big-angle norm values is represented by D(k,−k) and D(−k, k), where k=1; the pairs of the big-angle norm values are represented by D(k,−k) and D(−k,k), where k=2, ...,W. The set of reference values is defined as $T_k=f_4(D_v,k)=D_v*P_k$, where $D_v$ is the vertical vector norm value and $P_k<1$.

With the foregoing and other objects in view there is provided, in accordance with the invention, an edge direction detection system. The edge direction detection system includes: a vector norm value calculation device for calculating vector norm values associated with different directions from a plurality of adjoining pixels being on two lines and being related to a selected pixel on a line between the two lines, the vector norm values including small-angle vector norm values, big-angle vector norm values, and a vertical vector norm value; a vertical direction checker for using the vertical vector norm value for determining whether the selected pixel is in a non-vertical edge area; a small-angle direction checker using the small-angle vector norm values to determine candidate edge directions and to determine whether one of the candidate edge directions is associated with a preferred direction; a direction verifier for verifying that one of the candidate directions is consistent with an additional candidate edge direction; a direction fine-tuner for obtaining an edge direction being more accurate than the additional candidate direction and being based on the additional candidate direction; and a big-angle direction detector for obtaining an edge direction based solely on the big-angle vector norm values when said small-angle direction checker determines that the candidate edge directions are not associated with a preferred direction.

The present invention is based on:
(a) Calculating vector norm values that give an indication of the correlations between the pixel values of two vectors. These vector norm values can be used in order to improve the range of detection of edge directions and to effectively prevent false directions from being detected. A vector consists of a plurality of adjoining pixels that are on one of two selected lines and that are related to a selected pixel. Instead of using vectors of different lengths, the present invention uses vectors that all have the same length.
(b) Selecting the vertical direction as the edge direction if the vertical vector norm value is smaller than a predetermined value. This indicates that the selected pixel is in a vertical edge area or in a smooth area.
(c) For a non-vertical edge area or a smooth area, checking small-angle vector norm values associated with small angles from the vertical direction. These small-angle vector norm values are placed into two groups and a candidate edge direction is detected within each group.
(d) When a candidate edge direction is associated with a preferred direction, performing a direction verification process to validate the candidate edge orientation. If a candidate edge direction is validated using an additional candidate edge direction, a direction fine-tuning process is performed to obtain a more accurate orientation based on the additional candidate edge direction. When no candidate edge directions have been detected, a direction detecting process is performed by checking big-angle vector norm values associated with big angles from the vertical direction. The direction checking process begins with checking an initial big-angle vector norm value associated with an initial big-angle from the vertical direction. Then big-angle vector norm values associated with increasingly bigger angles from the vertical direction are successively checked. Whenever there is a direction along which the big-angle vector norm value is smaller than a corresponding current reference value, that direction may be chosen as the edge orientation.

Key differences between the invention disclosed herein and the direction detection method described in U.S. Pat. No. 5,786,862 include:
(a) In the invention, vector norm values in different directions all have the same length.
(b) In the invention, candidate edge directions are detected by using small-angle vector norm values associated with small angles from the vertical direction. Along a candidate edge direction, the vector correlation should be significantly higher than that in the vertical direction. A higher vector correlation is indicated by a lower vector norm value. These candidate edge directions, however, are not final. They need to be further verified and adjusted.
(c) In the invention, a non-vertical edge direction is only established after performing a fine-tuning process or direction detection process that involves checking big-angle vector norm values associated with big angles from the vertical direction.

DESCRIPTION OF THE PREFERRED EMBODIMENTS

Figure 1:
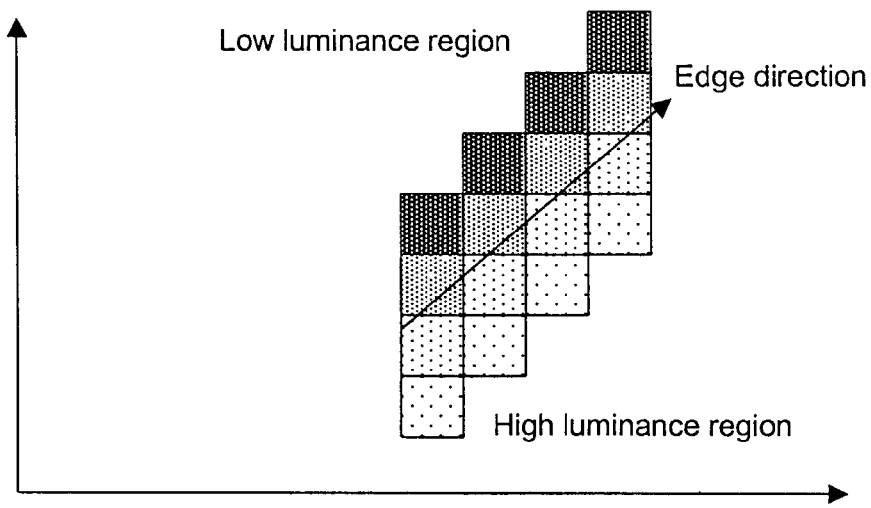
FIG. 1 is a diagram provided for explaining the definition of an edge direction.

We will begin by providing some introductory material upon which the invention is based. In this description, $\{I(n_1-1,\cdot)\}$ and $\{I(n_2-1,\cdot)\}$ denote different scan lines of data samples that can be obtained by interlaced or non-interlaced scan operations. In the case of interlaced scan lines, an edge direction is detected by checking scan lines having samples $\{I(n_1-1,\cdot)\}$ and $\{I(n_1+1,\cdot)\}$. In the case of non-interlaced scan lines, an edge direction is detected by checking scan lines having samples $\{I(n_1-1,\cdot)\}$ and $\{I(n_1,\cdot)\}$. For simplicity, the following description of the invention is based on interlaced scan lines. The described procedures can also be applied to non-interlaced scan lines by replacing the samples $\{I(n_1+1,\cdot)\}$ with the samples $\{I(n_1,\cdot)\}$.

The invention is based on defining vectors according to equations (1) and (2):

$$U(l) = [I(n_1-1, n_2-L+l), \ldots, I(n_1-1, n_2+l), \ldots, \quad (1)$$
$$I(n_1-1, n_2+L+l)]$$
$$= [U_{-L}(l), \ldots, U_0(l), \ldots, U_L(l), \text{ and}$$

$$V(m) = [I(n_1+1, n_2-L+m), \ldots, I(n_1+1, n_2+m), \ldots, \quad (2)$$
$$I(n_1+1, n_2+L+m)]$$
$$= [V_{-L}(m), \ldots, V_0(m), \ldots, V_L(m)].$$

Here, L is a constant relating to the length of each vector, and it should be clear that the length of each vector is 2L+1. According to equation (1), the vector U(l) is composed of (2L+1) consecutive data samples on an upper scan line, which is above a selected pixel $I(n_1,n_2)$. The center of the vector U(l) is offset by l pixels from a vertical axis passing through $n_2$. Similarly, the vector V(m) is composed of (2L+1) consecutive data samples on a lower scan line, which is below the selected pixel $I(n_1,n_2)$ The center of the vector V(m) is offset by m pixels from the vertical axis passing through $n_2$. V(-l) is symmetrical to U(l) with respect to the selected pixel $I(n_1,n_2)$.

The invention is also based on determining whether the two vectors U(l) and V(m) are highly correlated. In order to determine this correlation, we define a weighted norm D of the vectors according to the following equation (3):

$$D(l, m) = \frac{1}{M} \sum_{i=-L}^{L} |U_i(l) - V_i(m)| C_i. \quad (3)$$

Here, $C_l$ is a weight value and $$M = \sum_i C_i.$$

The weighted norm D is directly related to vector correlation. It represents the weighted difference of the two vectors U(l) and V(m). Therefore, the smaller the value of the weighted norm D becomes, the higher the vector correlation becomes. In the following description, all of operations relating to vector correlation are obtained by using the weighted norm D defined above.

We finish the introductory material by defining and explaining three types of vector norm values: a vector norm value associated with the vertical direction, a small-angle vector norm value associated with a direction having a small angle from the vertical direction, and a big-angle vector norm value associated with a direction having a big angle from the vertical direction.

The vector norm value associated with the vertical direction, also called the vertical vector norm value, is obtained by assigning 0 to both of the variables l and m in equation (3), and by doing this we obtain equation (4):

$$D_v = D(0, 0) = \frac{1}{M} \sum_{i=-L}^{L} |U_i(0) - V_i(0)| C_i. \quad (4)$$

Figure 2A:
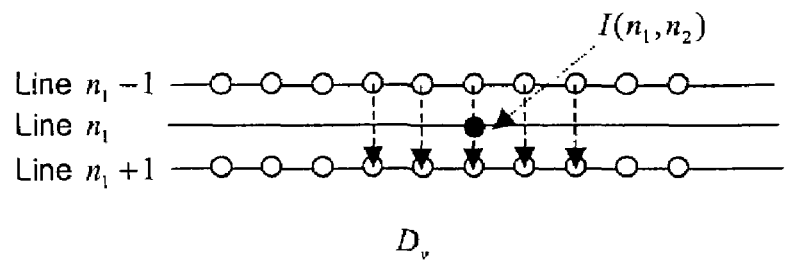
FIG. 2A shows the vertical direction associated with the vertical vector norm value.
Figure 2B:
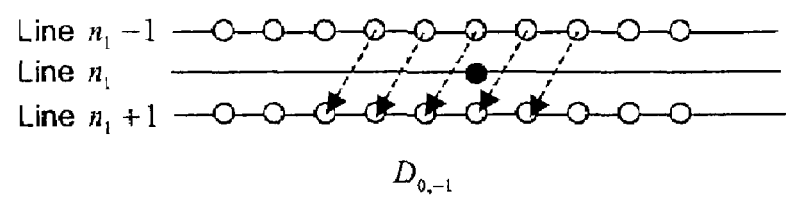
FIGS. 2B–2E show the directions associated with various small-angle vector norm values.
Figure 2C:
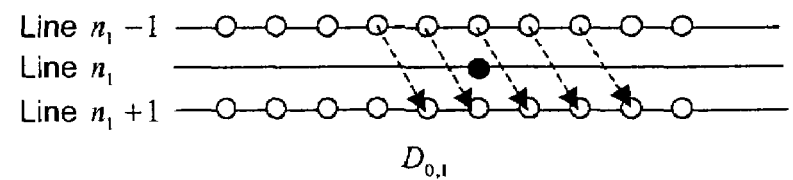
Figure 2D:
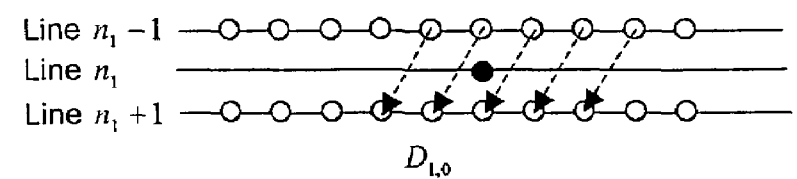
Figure 2E:
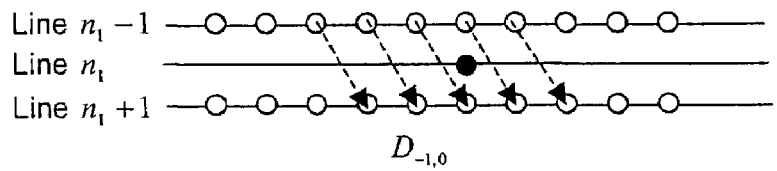

FIG. 2A shows the pixel on line $n_1$ that is defined as the selected pixel, and shows the relationship between the pixels on the two lines $n_1-1$ and $n_1+1$. For each value of i in equation (4), it can be seen that the line drawn between the corresponding pixels on the two lines is in the vertical direction. In the example, L=2 and so the length of the vectors U(l) and V(m) is 2L+1=5.

Small-angle vector norm values that are associated with directions having small angles from the vertical direction are calculated using equation (3) with l and m taking values from $\{-1,0+1\}$, however, only one of l and m can have a non-zero value. The case where l and m both equal 0 is also excluded since, that situation defines the vector norm associated with the vertical direction. FIGS. 2B–2E show the directions associated with the four small-angle vector norms $D_{l,m}$:

$$D_{0,-1}=D(0,-1); D_{0,1}=D(0,1); D_{1,0}=D(1,0); \text{ and } D_{-1,0}=D(-1,0).$$

Lastly, big-angle vector norm values associated with directions having big angles from the vertical direction are calculated using equation (3) by letting l and m take integer values from [−W,−1] and [1,W] as expressed by the following equation:

$$D_{-l,l}=D(l,-l)l\epsilon([-W,-1]\cup[1,W]); \text{ where } l \text{ is integer.}$$

The big-angle vector norm values are associated with directions having bigger angles, with respect to the vertical direction, than the small angles that are associated with the small-angle vector norm values. It will be further explained below that in a direction fine-tuning process, big-angle vector norm values will be calculated in which the value of l will not take on the values of 1 and −1.

Now we are ready to discuss the inventive method in detail. First, we select a pixel that is on the center line between the two scan lines, and we define this pixel as the selected pixel $I(n_1,n_2)$. Now we want to determine whether we have a case in which the selected pixel $I(n_1,n_2)$ is located in either a vertical edge area or a smooth area without an edge, or whether we have a case in which the selected pixel $I(n_1,n_2)$ is in an area that can be considered as having a non-vertical edge. In this disclosure, we are not concerned with differentiating between the case when the selected pixel $I(n_1,n_2)$ is in a vertical edge area and the case when the selected pixel $I(n_1,n_2)$ is in a smooth area. Whether or not it is important to distinguish between these two cases depends upon the particular application.

Next, we calculate the vector norm value $D_v$ associated with the vertical direction by using equation (4). As the value of $D_v$ calculated with equation (4) becomes smaller, the vertical correlation becomes higher. A checking function $f_1$ can be defined and used to check whether the vertical correlation is high enough. Although the invention is not limited to any particular checking function, in the preferred embodiment, equation (5) is used as the checking function:

$$f_1(x)=x-T_v. \quad (5)$$

$T_v$ is a predetermined reference correlation value. When $f_1(D_v)<0$, the vertical correlation is high enough to conclude that the selected pixel $I(n_1,n_2)$ is in either a vertical edge area or in a smooth area without an edge. We do not know which case we have and it is not considered in this disclosure. When $f_1(D_v)<0$, and it has been concluded that the selected pixel is in either a vertical edge area or in a smooth area without an edge, the steps described so far can be repeated with respect to another selected pixel.

Figure 3:
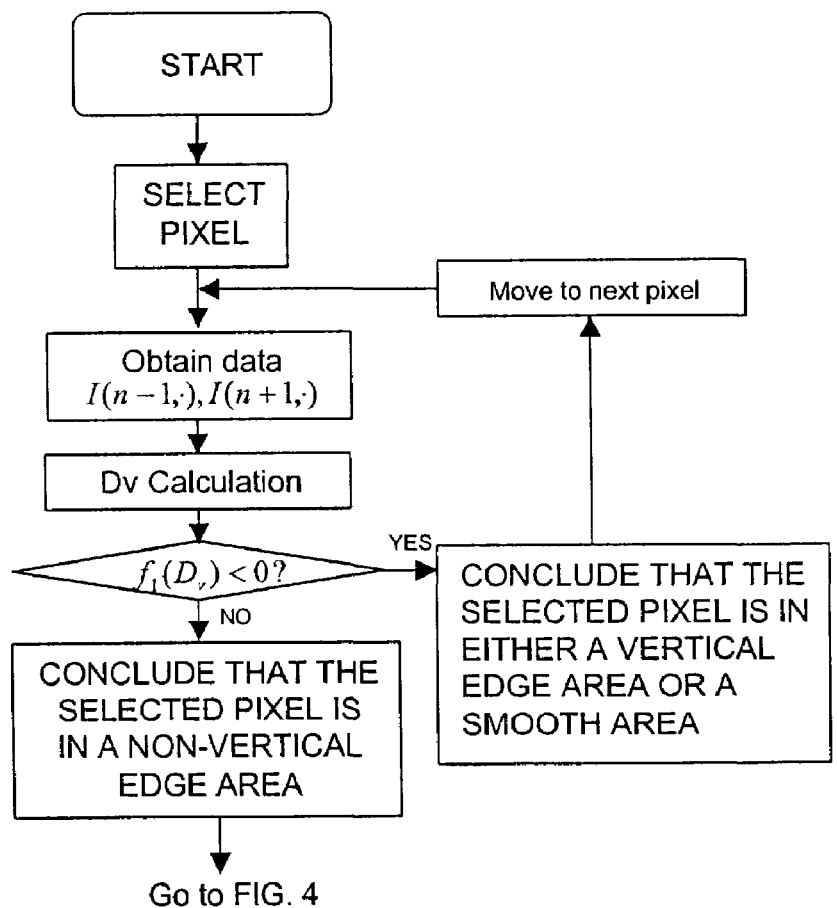
FIG. 3 is a flow chart showing the step of determining whether the selected pixel is in an area that can be considered as having a non-vertical edge.

The flowchart for the step of determining whether we have a case in which the selected pixel $I(n_1,n_2)$ is located in either a vertical edge area or a smooth area without an edge, or whether we have a case in which the selected pixel $I(n_1,n_2)$ is in an area that can be considered as having a non-vertical edge is shown in FIG. 3. When $f_1(D_v) \geq 0$, it means that the vertical correlation is low, and that the current area can be considered as containing a non-vertical edge.

If the current area is considered to contain a non-vertical edge, then we will want to try to determine the direction of this non-vertical edge. In order to do this, we need to determine two candidate edge directions $Dir_1$ and $Dir_2$. Then we will perform a direction verification process to see if the candidate edge directions $Dir_1$ and $Dir_2$ are likely to be somewhat close to the actual edge direction at the position of the selected pixel $I(n_1,n_2)$. To determine the candidate edge directions $Dir_1$ and $Dir_2$, first we calculate the small-angle vector norms:

$$D_{0,-1}=D(0,-1); D_{0,1}=D(0,1); D_{1,0}=D(1,0); \text{ and } D_{-1,0}=D(-1,0).$$

The five vector norm values, which have been calculated so far, are then partitioned into two groups: $\{D_v, D_{-1,0}, D_{1,0}\}$ and $\{D_v, D_{0,1}, D_{0,-1}\}$. In addition, a direction checking function $f_2$ is defined according to equation (6):

$$f_2(x, y, z, T_s) = \begin{cases} -1 & \text{if } x = \min(x, y, z) \text{ and } x < \max(x, y, z) * T_s \\ 1 & \text{if } z = \min(x, y, z) \text{ and } z < \max(x, y, z) * T_s \\ 0 & \text{Otherwise} \end{cases} \quad (6)$$

The threshold $T_s$ is less than one. The purpose of the threshold $T_s$ in equation (6) is to make sure that the minimum value detected is a significant minimum. This is used to distinguish the case from that when vector norm values in a group have values that are very close to one another, and therefore a minimum vector norm value in that group does not give much indication of the edge direction.

Using (6), a candidate edge direction can be obtained from each of the two groups. These candidate edge directions $Dir_1$ and $Dir_2$ are defined as:

$$Dir_1 = f_2(D_{-1,0}, D_v, D_{1,0}, T_{s1}) \quad (7)$$

$$Dir_2 = f_2(D_{0,1}, D_v, D_{0,-1}, T_{s1}). \quad (8)$$

When one of $Dir_1$ and $Dir_2$ has a non-zero value, the respective candidate edge direction indicates a preferred direction that is non-vertical. When a particular candidate edge direction equals zero, it means that a preferred direction has not been found by checking that group of vector norm values. A preferred direction is the one that is likely to be somewhat close to the correct edge direction at the position of $I(n_1,n_2)$, and can actually be the correct edge direction. Therefore, depending on the values of $Dir_1$ and $Dir_2$, we will have one of the following two cases:
 a) A non-vertical edge area with at least one preferred direction (when $Dir_1 \neq 0$ or $Dir_2 \neq 0$); and
 b) A non-vertical edge area without a preferred direction (when $Dir_1 = Dir_2 = 0$).

Figure 4:
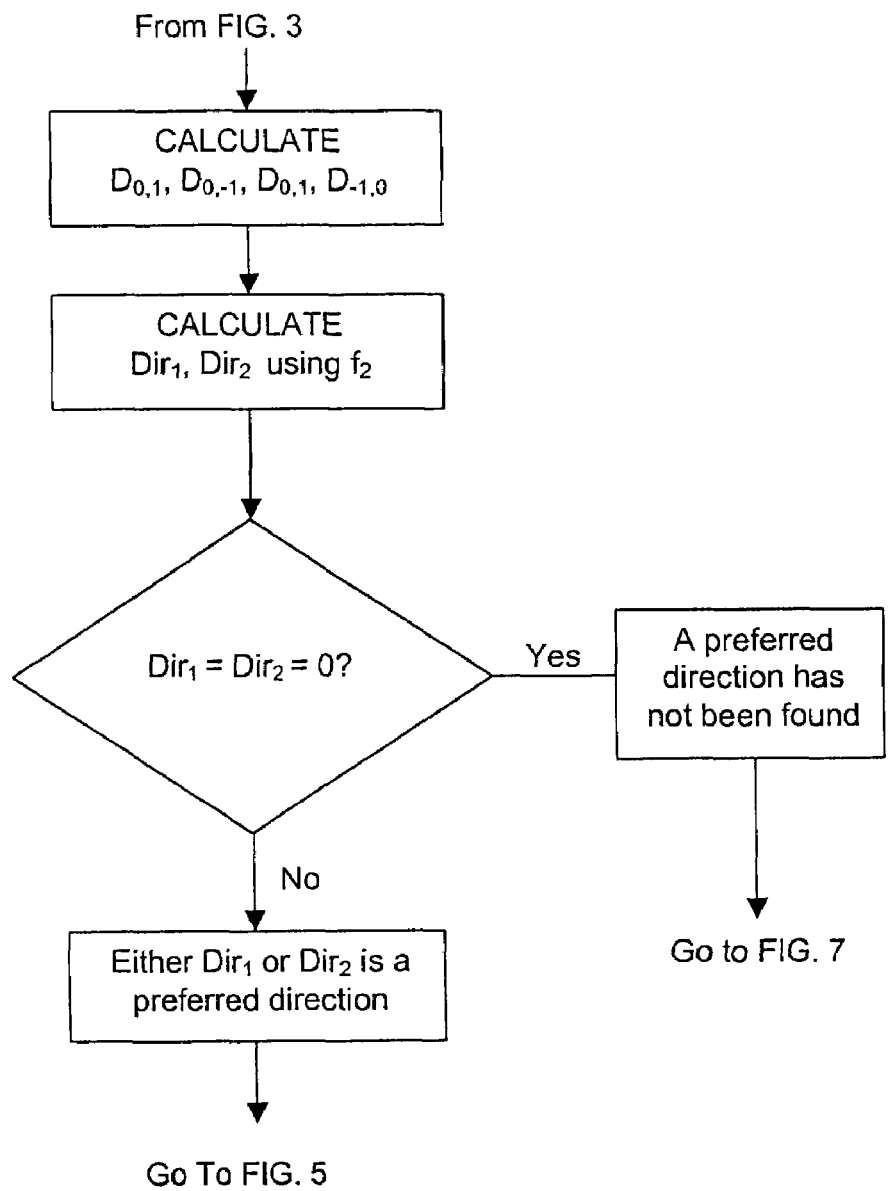
FIG. 4 is a flow chart showing the step of determining candidate edge directions.

FIG. 4 shows the step of determining the candidate edge directions $Dir_1$ and $Dir_2$, and checking to see if a candidate edge direction $Dir_1$ or $Dir_2$ is non-zero, which indicates that a preferred direction has been found.

When we have case a) described above, namely the case of a non-vertical edge area in which a preferred direction has been found, the next step is the performance of a direction verification process to further validate the preferred direction. If the direction verification process does, in fact, validate the preferred direction, then the next step is the performance of a direction fine-tuning process that will provide a more accurate edge direction.

Figure 5:
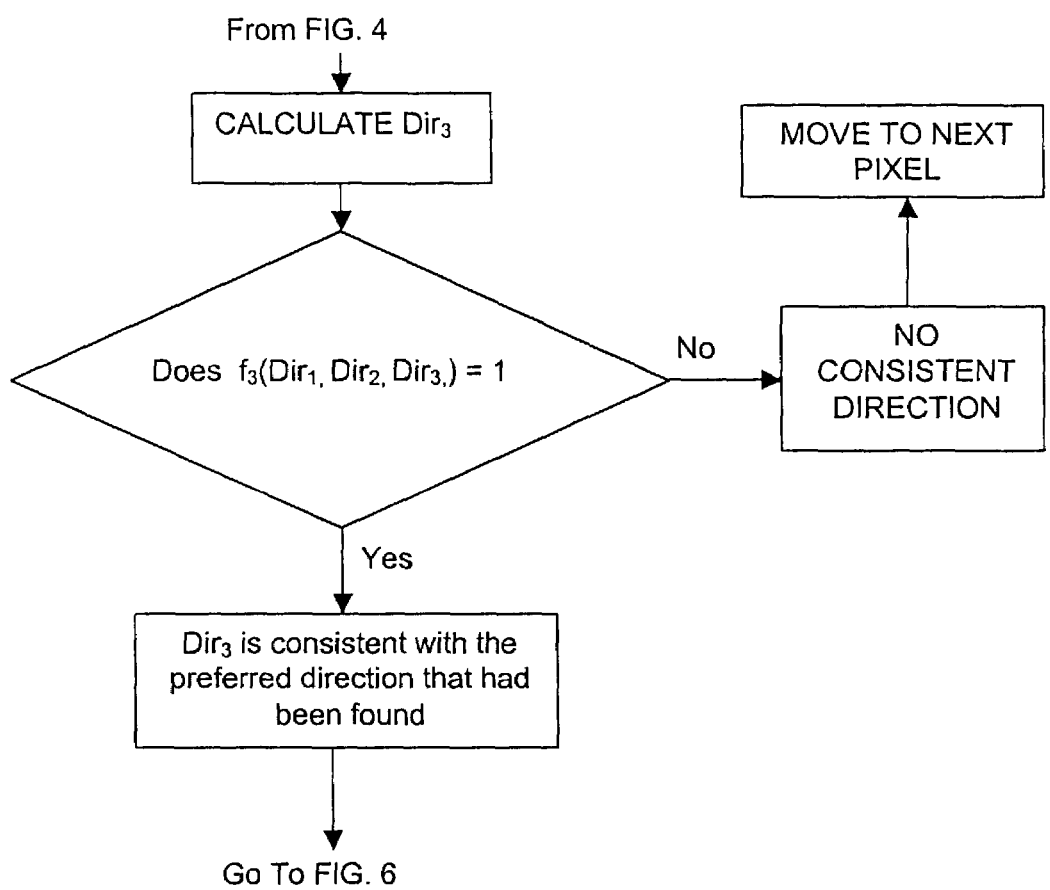
FIG. 5 is a flow chart showing the step of performing the direction verification process.

The direction verification process is shown in FIG. 5. In this process, one more group of three vector norm values is formed, which includes $D_v$, $D_{1,-1}$ and $D_{-1,1}$. Similar to the previous processing, an additional candidate edge direction is found by using the same checking function $f_2$. In this exemplary embodiment, this additional candidate edge direction is $Dir_3$ and is expressed by equation (9).

$$Dir_3 = f_2(D_{-1,1}, D_v, D_{1,-1}, T_{s2}) \quad (9)$$

A direction verification function $f_3$ is now defined to validate the current candidate edge directions. So far there are three candidate edge directions: $Dir_1$, $Dir_2$ and $Dir_3$. The direction verification function $f_3$ is based on the three candidate edge directions.

In the preferred embodiment, the direction verification function $f_3$ is defined according to equation (10).

$$f_3(Dir_1, Dir_2, Dir_3) = \begin{cases} -1 & \text{if } (Dir_1 \neq 0 \text{ and } Dir_1 \neq Dir_3) \text{ or} \\ & (Dir_2 \neq 0 \text{ and } Dir_2 \neq Dir_3) \\ 1 & \text{otherwise} \end{cases} \quad (10)$$

In this process, there is at least one candidate edge direction, i.e. at least one of $Dir_1$ and $Dir_2$ has a non-zero value. According to equation (10), whichever of $Dir_1$ and $Dir_2$ is non-zero, the direction it represents must be consistent with $Dir_3$. If either $Dir_1$ or $Dir_2$ indicates a different non-vertical direction than $Dir_3$, then the direction verification function $f_3$ is set to be $-1$ to indicate that a consistent edge direction cannot be detected around the currently selected pixel.

If the direction verification function $f_3$ equals 1, it means that the direction represented by $Dir_3$ is consistent with the non-zero candidate edge direction $Dir_1$ or $Dir_2$ detected earlier. Therefore, the direction associated with the non-zero candidate edge direction $Dir_1$ or $Dir_2$ or both when $Dir_1=Dir_2$ is valid and the direction associated with $Dir_3$ is valid. It can be easily understood that $Dir_3$ must have a non-zero value in this case.

Once the candidate edge direction is verified, a direction fine-tuning process is performed to locate a more accurate direction based on the additional candidate edge direction $Dir_3$. Big-angle vector norm values with big angles from vertical direction are calculated using equation (3) with l and m taking integer values from $[-W,-2]$ and $[2,W]$ as shown in equation (11):

$$D_{-1,1}=D(l,-l), l \in ([-W,-2] \cup [2,W]), \text{ where l is an integer} \quad (11).$$

W is a constant relating to the correlation checking range with respect to the selected pixel $I(n_1,n_2)$, and $2W+1$ is the maximum correlation checking range. When assigning $m=-l$ in equation (3), the resulting vector norm values are always centered with respect to the selected pixel $I(n_1,n_2)$.

Figure 6:
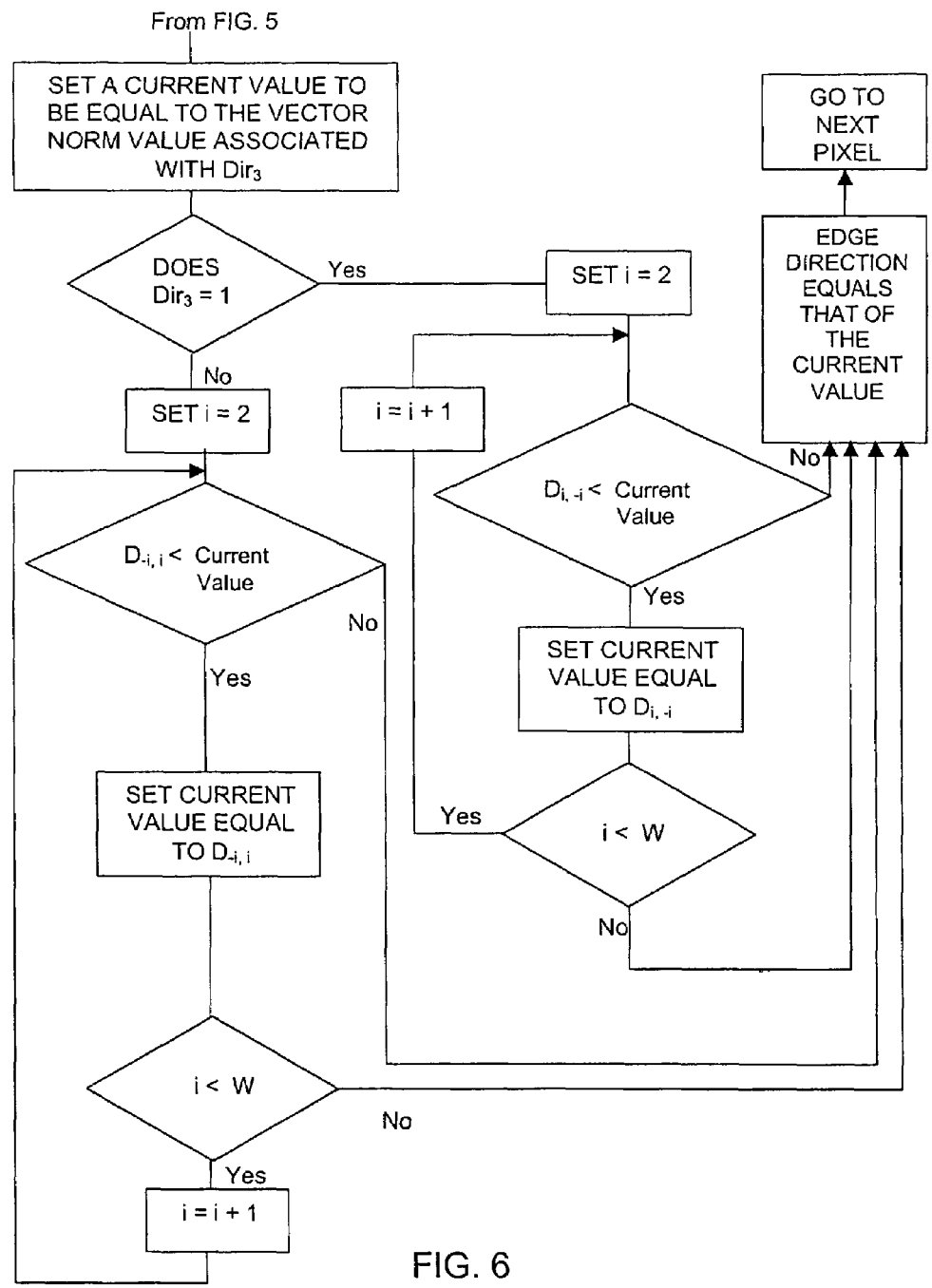
FIG. 6 is a flow chart showing the step of performing the direction fine-tuning process.

FIG. 6 shows the step of performing the direction fine-tuning process. In the direction fine-tuning process, a current value is set to be equal to the vector norm value associated with $Dir_3$. Then, starting from the vector norm value associated with $Dir_3$, the first big-angle vector norm value is calculated. Specifically, the first big-angle vector norm value is calculated using equation (11) and is compared with the current value. For example, when $Dir_3=1$, $D_{1,-1}$ is the minimum vector norm value in $\{D_{1,-1}, D_v, D_{-1,1}\}$. In this case, the first big-angle vector norm value to check would be $D_{2,-2}$. Similarly, when $Dir_3=-1$, the first big-angle vector norm value to check would be $D_{-2,2}$.

If the big-angle vector norm value is smaller than the current value, then the direction associated with the big-angle vector norm value gives a more accurate indication of the actual edge direction than the direction associated with the current value, therefore, the current value will be updated by being set to equal that big-angle vector norm value. Then, the subsequent big-angle vector norm value (l=3 or −3) will be compared with the current value, and if the subsequent big-angle vector norm value is smaller than the current value, then the current value will be set to be equal to that subsequent big-angle vector norm value. This process will continue until the next big-angle vector norm value is bigger than the current value or until the maximum correlation checking range W has been reached. Once the process stops, the direction represented by the current value is chosen as the edge direction.

Let us once again consider the step, shown in FIG. 4, of determining the candidate edge directions $Dir_1$ and $Dir_2$, and checking to see if a candidate edge direction $Dir_1$ or $Dir_2$ is non-zero. When $Dir_1=Dir_2=0$ from equation (7) and (8), it means that there is no preferred direction, and we have case b) that was discussed above. Thus, the results obtained so far provide no clue about the edge direction. Therefore, a big-angle direction detection step is performed solely based on big-angle vector norm values obtained using equation (12):

$$D_{-1,l} = D(l,-l),\ l \in ([-W,-1] \cup [1,W]),\text{ and } l \text{ is integer.} \quad (12)$$

The constant W is a constant relating to the correlation checking range with respect to the selected pixel $I(n_1, n_2)$, and 2W+1 is the maximum correlation checking range. When assigning m=−1 in equation (3), the resulting vector norm values are always centered with respect to the selected pixel $I(n_1, n_2)$.

In the direction checking process, all of the values obtained from equation (12) are checked against a set of reference values $T_k$ that are defined as follows:

$$\{T_k, k=1,2,\ldots,W\} \quad (13)$$

Figure 7:
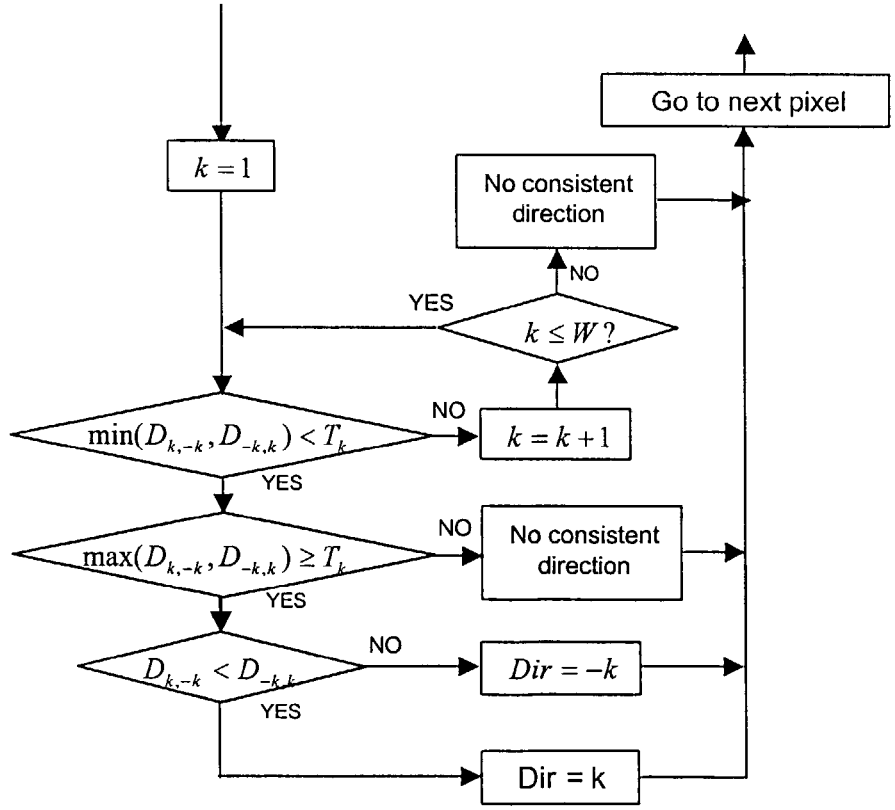
FIG. 7 is a flow chart showing the step of performing the direction detection step.

Starting with the pair of big-angle vector norm values $D_{1,-1}$ and $D_{-1,1}$, they are compared with $T_1$. If either one of them is smaller than $T_1$ but not both, then the direction associated with the smaller vector norm value is chosen as the edge direction and the direction checking process stops. If both of the big-angle vector norm values $D_{1,-1}$ and $D_{-1,1}$ are smaller than $T_1$, then the current area is classified as having no consistent edge direction and the direction checking process also stops. If neither of the big-angle vector norm values $D_{1,-1}$ and $D_{-1,1}$ is smaller than $T_1$, then the next pair of big-angle vector norm values $D_{2,-2}$ and $D_{-2,2}$ is checked. This process could continue until the maximum correlation checking range is reached. There are two possible results from this process: a) a valid edge direction is found, or b) no valid direction can be found. The flow chart for the big-angle direction detection step is shown in FIG. 7.

In this edge direction detection process, the reference norm values in (13) are crucial to the algorithm performance. A simple way to define these values is to use a set of fixed predetermined values. However, a better way is to associate $T_k$ with both $D_v$ and k. Therefore, $T_k$ is a function of $D_v$ and k. Assume that this function is $f_4$, then:

$$T_k = f_4(D_v, k). \quad (14)$$

In the preferred embodiment, $f_4$ has the following form:

$$f_4(D_v, k) = D_v * P_k.$$

Here, $\{P_k, k=1,2,\ldots,W\}$ is a set of percentage values, and $P_k<1$. Generally, the smaller the value of $P_k$ is, the lower the $T_k$ is, and therefore the higher the correlation that is required in order for the corresponding direction to be an edge direction in the above process.

Figure 8:
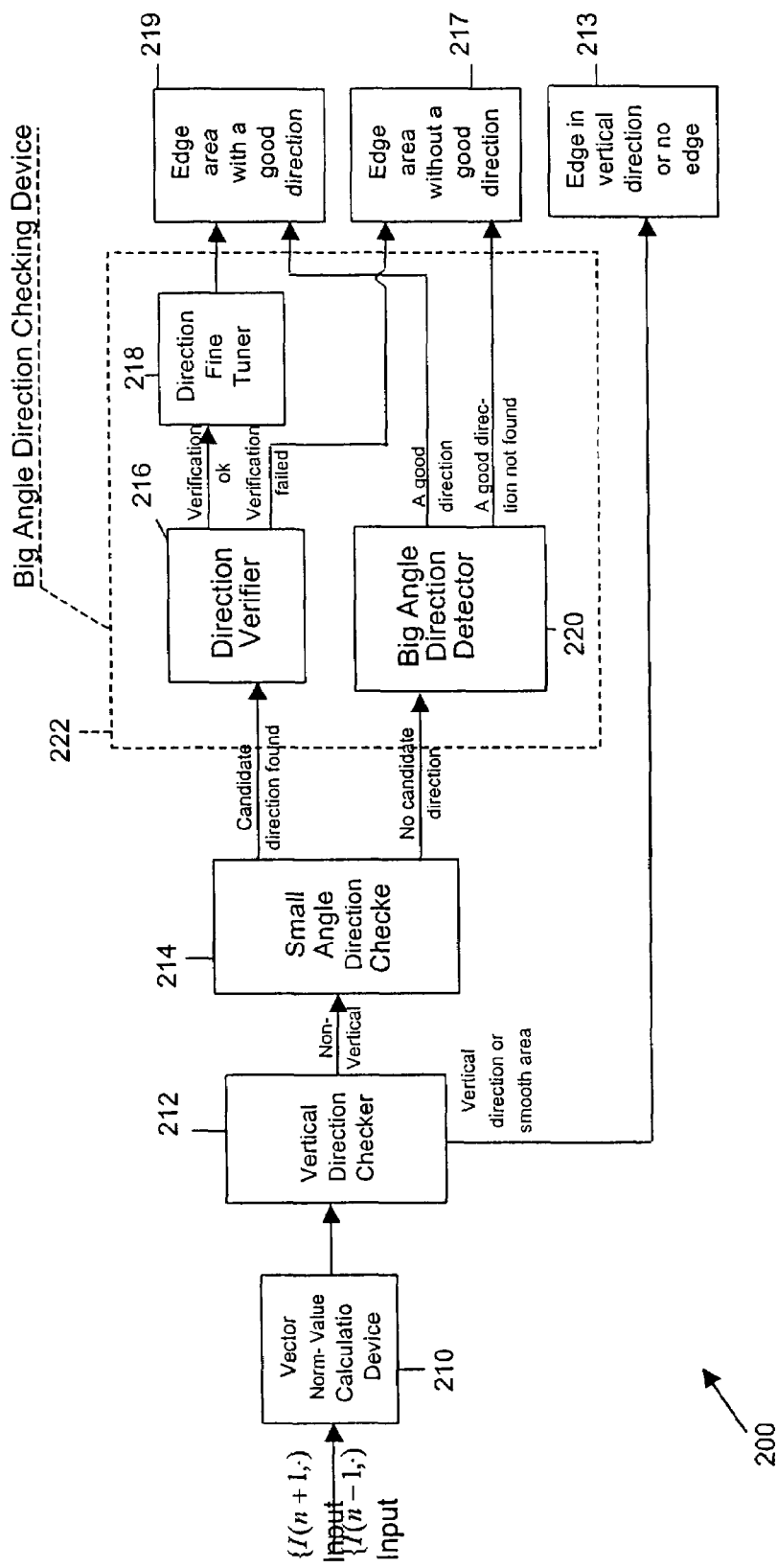
FIG. 8 is a system block diagram of an edge direction detection system.

FIG. 8 is the system block diagram of an edge direction detection system 200. A vector norm value calculation device 210 calculates the vertical vector norm value, the small-angle vector norm values, and the big-angle vector norm values. The vertical direction checker 212 checks the vector norm value in the vertical direction to see whether we have a case in which the selected pixel $I(n_1, n_2)$ is located in either a vertical edge area or a smooth area without an edge, or whether we have a case in which the selected pixel $I(n_1, n_2)$ is in an area that can be considered as having a non-vertical edge. If the checking function $f_1(D_v)$ indicates that the vector norm value $D_v$ has a high correlation in the vertical direction, then it is concluded that the selected pixel $I(n_1, n_2)$ is located in either a vertical edge area or a smooth area without an edge as shown by conclusion block 213.

If the checking function $f_1(D_v)$ indicates that the vector norm value $D_v$ has a sufficiently low correlation in the vertical direction, then it is concluded that the selected pixel $I(n_1, n_2)$ is located in a non-vertical edge area, and the small-angle direction checker 214 calculates the candidate edge directions $Dir_1$ and $Dir_2$ and determines whether one of the candidate edge directions $Dir_1$ and $Dir_2$ has a non-zero value. If a non-zero candidate edge direction is found, then the direction verifier 216 performs the direction verification process. If the verification process fails, then it is concluded that the selected pixel $I(n_1, n_2)$ is in an edge area, but a good representative direction cannot be found as shown by conclusion block 217. If the direction verification process verifies the direction of the non-zero candidate edge direction, then the direction fine tuner 218 performs the direction fine-tuning process to determine a more accurate edge direction as shown by conclusion block 219.

If the small-angle direction checker 214 determines that a non-zero candidate edge direction has not been found, then the big-angle direction detector 220 performs the big-angle direction detection step in an attempt to find an accurate edge direction. The dashed line indicates that the combination of the direction verifier 216, the direction fine tuner 218, and the big-angle direction checking device 222, since the steps performed by these components involve vector norm values associated with big angles from the vertical direction.

We claim:

1. A method for edge direction detection on a center line between two lines of an image having a plurality of lines of pixels, the method which comprises:

selecting a pixel that is on the center line and defining the pixel as a selected pixel;

calculating a vertical vector norm value from a plurality of adjoining pixels being on the two lines and being related to the selected pixel, the vertical vector norm value being associated with a vertical direction;

using the vertical vector norm value to determine whether the selected pixel is in a non-vertical edge area;

if the selected pixel is in the non-vertical edge area, then calculating two candidate edge directions based on a plurality of small-angle vector norm values each associated with a direction having a small-angle from the vertical direction;

if the candidate edge direction is associated with a preferred direction, verifying that the candidate edge direction is consistent with an additional candidate edge direction;

if every candidate edge direction that is associated with a preferred direction is consistent with the additional candidate edge direction, taking the additional candidate edge direction as a starting point for a direction fine tuning process including steps of:

determining whether at least one big-angle vector norm value is associated with a more accurate direction than the additional candidate edge direction, the big-angle vector norm value being associated with a direction having an orientation similar to the additional candidate edge direction, but having a bigger angle from the vertical direction than the additional candidate edge direction;

if the big-angle vector norm value is associated with a more accurate direction than the additional candidate edge direction, then selecting the more accurate direction as an edge direction for a position of the selected pixel; and if the big-angle vector norm value is not associated with a more accurate direction than the additional candidate edge direction, then selecting the additional candidate edge direction as the edge direction for the position of the selected pixel.

2. The method according to claim 1, wherein:

the step of calculating the candidate edge direction includes calculating at least two candidate edge directions; and when neither of the candidate edge directions is associated with a preferred direction, then performing a direction detection process based solely on big-angle vector norm values associated with directions having bigger angles from the vertical direction than the small-angle.

3. The method according to claim 1, which comprises:

calculating a plurality of vector norm values from the plurality of the adjoining pixels being on the two lines and being related to the selected pixel;

the plurality of the vector norm values including the vertical vector norm value, the big-angle vector norm value, and the plurality of the small-angle vector norm values.

4. The method according to claim 3, wherein:

the plurality of the vector norm values are based on vectors defined as:

$$U(l) = [I(n_1 - 1, n_2 - L + l), \ldots, I(n_1 - 1, n_2 + l), \ldots, I(n_1 - 1, n_2 + L + l)]$$
$$= [U_{-L}(l), \ldots, U_0(l), \ldots, U_L(l)], \text{ and}$$

$$V(m) = [I(n_1 + 1, n_2 - L + m), \ldots, I(n_1 + 1, n_2 + m), \ldots, I(n_1 + 1, n_2 + L + m)]$$
$$= [V_{-L}(m), \ldots, V_0(m), \ldots, V_L(m)];$$

I is an original image;

L is a constant that relates to a length of each of the vectors; and

L the length of each of the vectors is 2L+1.

5. The method according to claim 4, wherein:

each of the plurality of the vector norm values is defined as:

$$D(l, m) = \frac{1}{M} \sum_{i=-L}^{L} |U_i(l) - V_i(m)| C_i;$$

$C_i$ is a weight value; and $$M = \sum_i C_i.$$

6. The method according to claim 5, wherein:

the vertical vector norm value is defined as:

$$D_v = D(0, 0) = \frac{1}{M} \sum_{i=-L}^{L} |U_i(0) - V_i(0)| C_i; \text{ and}$$

$C_i$ is a weight value.

7. The method according to claim 5, wherein:

the plurality of the small-angle vector norm values are defined as:

$$D_{l,m} = D(l, m) = \frac{1}{M} \sum_{i=-L}^{L} |U_i(l) - V_i(m)| C_i; \text{ and}$$

$(l,m) \in \{(1,0),(-1,0),(0,1),(0,-1)\}$.

8. The method according to claim 5, wherein:

the big-angle norm value is defined as:

$$D(l, -l) = \frac{1}{M} \sum_{i=-L}^{L} |U_i(l) - V_i(-l)| C_i l \in ([-W, -1] \cup [1, W]);$$

l is an integer;

W is a constant that relates to a correlation checking range; and

2W+1 is a maximum correlation checking range.

9. The method according to claim 1, wherein:

the step of using the vertical vector norm value to determine whether the selected pixel is in the non-vertical edge area includes using a checking function that is equal to the vertical vector norm value minus a predetermined reference correlation value.

10. The method according to claim 1, wherein the step of calculating at least one candidate edge direction includes:

defining an angle correlation checking function as:

$$f_2(x, y, z, T_s) \begin{cases} -1 & \text{if } x = \min(x, y, z) \text{ and } x < \max(x, y, z) * T_s \\ 1 & \text{if } z = \min(x, y, z) \text{ and } z < \max(x, y, z) * T_s \\ 0 & \text{Otherwise;} \end{cases}$$

using the angle correlation checking function to obtain a first candidate direction defined as $\text{Dir}_1 = f_2(D_{-1,0}, D_v, D_{1,0}, T_{s1})$; and using the angle correlation checking function to obtain a second candidate direction defined as $\text{Dir}_2 = f_2(D_{0,1}, D_v, D_{0,-1}, T_{s1})$;

$T_{S1}$ being a threshold value, $D_v$ being the vertical vector norm value, and $D_{-1,0}$, $D_{1,0}$, $D_{0,1}$, and $D_{0,-1}$ being small-angle vector norm values each associated with a respective direction having a small-angle from the vertical direction.

11. The method according to claim 10, which comprises: when $\text{Dir}_1 = \text{Dir}_2 = 0$, concluding that the first candidate direction and the second candidate direction are not associated with a preferred direction.

12. The method according to claim 10, wherein the step of verifying that the candidate edge direction is consistent with the additional candidate edge direction includes:
defining a direction verification function as:

$$f_3(\text{Dir}_1, \text{Dir}_2, \text{Dir}_3) = \begin{cases} -1 & \text{if } (\text{Dir}_1 \neq 0 \text{ and } \text{Dir}_1 \neq \text{Dir}_3) \text{ or} \\ & (\text{Dir}_2 \neq 0 \text{ and } \text{Dir}_2 \neq \text{Dir}_3) \quad ; \text{ and} \\ 1 & \text{otherwise} \end{cases}$$

defining the additional candidate direction as $\text{Dir}_3 = f_2(D_{-1,1}, D_v, D_{1,-1}, T_{s2})$;

$T_{S2}$ being a threshold value, $D_v$ being the vertical vector norm value, and $D_{-1,1}$ and $D_{1,-1}$ being vector norm values each associated with a respective direction having an angle from the vertical direction being bigger than the small-angle.

13. The method according to claim 1, wherein:
the step of determining whether a big-angle vector norm value is associated with a more accurate direction than the candidate edge direction, includes:
determining whether an initial big-angle vector norm value is associated with a more accurate direction than the candidate edge direction, and if so, setting a current value to be equal to the initial big-angle vector norm value,
determining whether a succeeding big-angle norm vector value, which is associated with a direction having a bigger angle from the vertical direction than the current value, has a value that is smaller than the current value, and if so, setting the current value to be equal to the succeeding big-angle norm vector value, and
repeating the step of determining whether the succeeding big-angle norm vector value has a value that is smaller than the current value until an event occurs that is selected from a group consisting of finding a succeeding big-angle norm vector value that is greater than the current value and reaching a maximum correlation checking range; and the step of selecting the more accurate direction as the edge direction for the position of the selected pixel includes selecting the direction associated with the current value as the edge direction for the position of the selected pixel.

14. The method according to claim 1, which comprises, if the candidate edge direction is not associated with a preferred direction:
checking a first pair of big-angle norm values against a reference value;
if only one big-angle norm value of the first pair of the big-angle norm values is smaller than the reference value, selecting the one big-angle norm value as representative of the edge direction for the position of the selected pixel;
if both big-angle norm values of the first pair of the big-angle norm values is smaller than the reference value, concluding that a consistent edge direction for the position of the selected pixel cannot be determined; and
if both big-angle norm values of the first pair of the big-angle norm values is greater than the reference value:
continuing to check pairs of big-angle norm values against corresponding reference values until obtaining an event selected from a group consisting of reaching a maximum correlation checking range and finding one of the pairs of the big-angle norm values having only one norm value being smaller than the corresponding one of the reference values, and
selecting the one norm value of the one of the pairs of the big-angle norm values as being representative of the edge direction for the position of the selected pixel.

15. The method according to claim 14, wherein:
the reference value and the corresponding reference values form a set of reference values $T_k$, where $k=1, 2, \ldots, W$, and $W$ is a maximum correlation checking range;
the first pair of the big-angle norm values is represented by $D(k,-k)$ and $D(-k,k)$, where $k=1$;
the pairs of the big-angle norm values are represented by $D(k,-k)$ and $D(-k,k)$, where $k=2, \ldots, W$; and
$T_k = f_4(D_v, k) = D_v * P_k$, where $D_v$ is the vertical vector norm value and $P_k < 1$.

16. An edge direction detection system, comprising:
a vector norm value calculation device for calculating vector norm values associated with different directions from a plurality of adjoining pixels being on two lines and being related to a selected pixel on a line between the two lines, the vector norm values including small-angle vector norm values, big-angle norm values, and a vertical vector norm value;
a vertical direction checker for using the vertical vector norm value for determining whether the selected pixel is in a non-vertical edge area;
a small-angle direction checker using the small-angle vector norm values to determine candidate edge directions and to determine whether one of the candidate edge directions is associated with a preferred direction;

a direction verifier for verifying that one or both of the candidate directions that are associated with a preferred direction is consistent with an additional candidate edge direction;

a direction fine-tuner for obtaining an edge direction being more accurate than the additional candidate direction and being based on the additional candidate direction; and a big-angle direction detector for obtaining an edge direction based solely on the big-angle vector norm values when said small-angle direction checker determines that the candidate edge directions are not associated with a preferred direction.

* * * * *